United States Patent [19]
Thomas

[11] 3,991,419
[45] Nov. 9, 1976

[54] RECEIVER SYSTEM FOR LOCATING TRANSMITTERS

[75] Inventor: Leslie D. Thomas, Baltimore, Md.

[73] Assignee: The United States of America as represented by the Secretary of the Interior, Washington, D.C.

[22] Filed: Jan. 26, 1976

[21] Appl. No.: 652,347

[52] U.S. Cl. .............................. 343/206; 325/435
[51] Int. Cl.² ......................................... H04B 1/26
[58] Field of Search ............... 325/28, 51, 52, 56, 325/474–477, 435; 343/206, 113 R; 324/77 E

[56] References Cited
UNITED STATES PATENTS

| | | | |
|---|---|---|---|
| 1,816,579 | 7/1931 | Hammond, Jr. | 325/56 |
| 3,104,393 | 9/1963 | Vogelman | 325/56 |
| 3,418,574 | 12/1968 | Wyckoff | 324/77 E |
| 3,604,004 | 9/1971 | Buyer | 343/113 R |

Primary Examiner—Robert L. Richardson
Assistant Examiner—Jin F. Ng
Attorney, Agent, or Firm—Gersten Sadowsky; Donald R. Fraser

[57] ABSTRACT

A receiver system for locating transmitters, such as underground transmitters carried by trapped miners, includes a power divider for splitting an incoming signal for supply to a plurality of frequency selective paths each having a mixer and a bandpass filter. The mixers are provided with different local oscillator signals to permit simultaneous tuning to a fundamental transmitter frequency and its harmonics. A local oscillator generator coherently produces the local oscillator signals by mixing a frequency N times greater than the center frequency of the bandpass filters with a frequency N times greater than a fundamental frequency to be received and dividing the mixing output by N.

10 Claims, 3 Drawing Figures

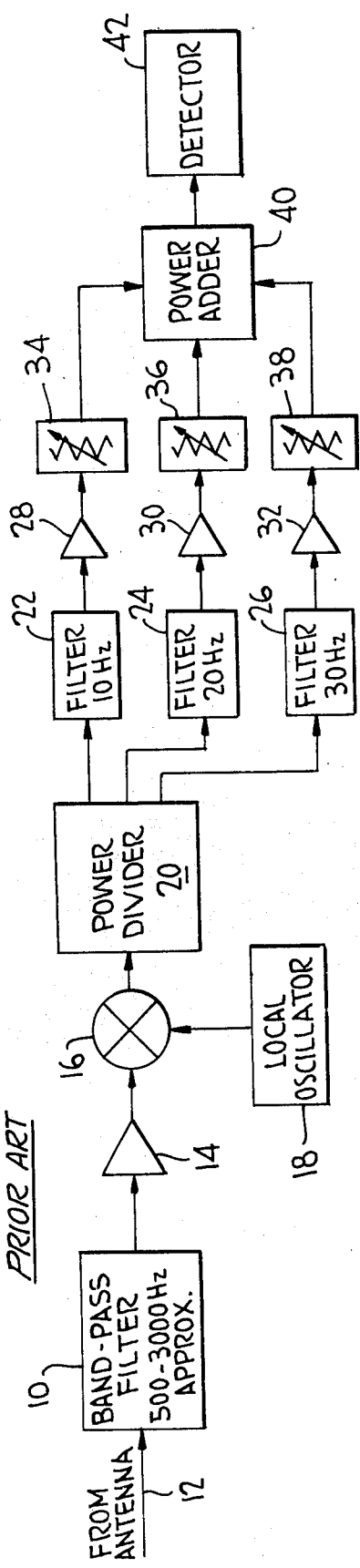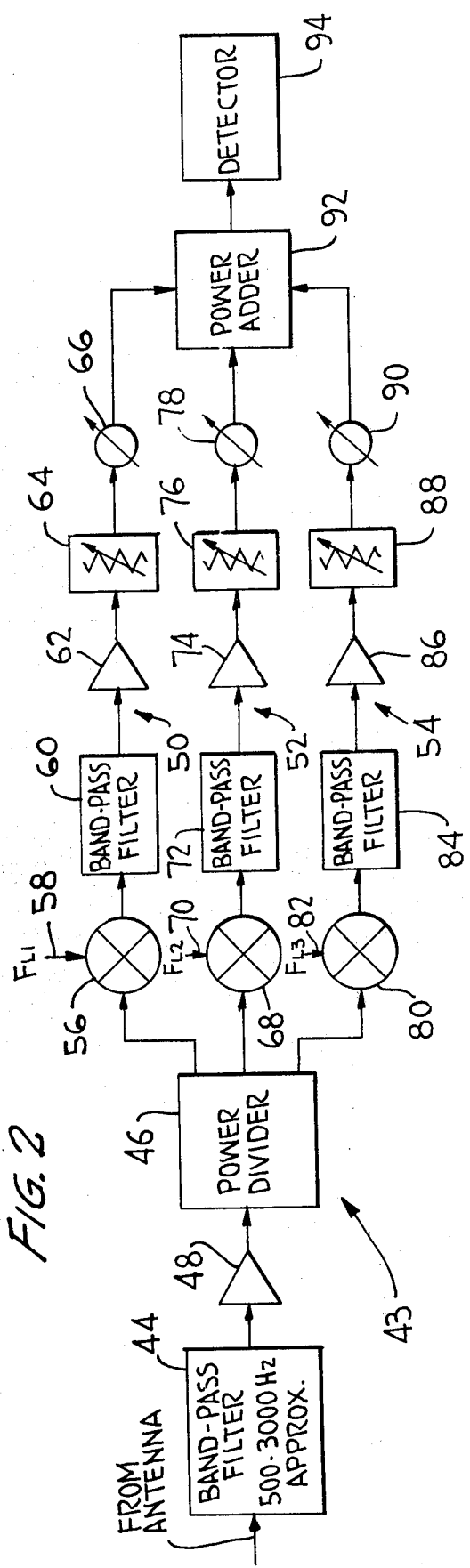

RECEIVER SYSTEM FOR LOCATING TRANSMITTERS

BACKGROUND OF THE INVENTION

1. Field of the Invention

The present invention pertains to a receiver system for locating transmitters and has particular utility for locating transmitters carried by miners trapped underground.

2. Discussion of the Prior Art

Underground mining is a hazardous occupation due to the continuous threat of being trapped underground by a cave-in. When such cave-ins occur, it is important to locate miners trapped underground in order to facilitate their rescue. Accordingly, miners have carried portable transmitters which can be energized in an emergency to produce a signal permitting people above the ground to determine the miners' locations.

One prior art method of locating an underground transmitter, such as a portable transmitter carried by a trapped miner, is to cause there to be a large pulse of current in a loop of wire laid out upon the ground and to detect the resulting magnetic field at the surface. The relative behavior of the horizontal and vertical components of this field makes it possible to locate a point on the surface above the location of the underground source. It is necessary to detect these signals in the presence of both natural and man-made noise, and the power which can be generated underground is limited by both safety considerations and by the available power under emergency conditions. In addition, detecting the location of the signals involves determining conditions of maxima, equality between the vertical and horizontal field components, and nulls in the horizontal field. The performance of this method is limited by the presence of noise and low power and must work under unfavorable signal-to-noise ratio (S/N) conditions. Furthermore, under actual emergency conditions there will frequently be several underground transmitters in operation, and it must be possible to examine them one at a time while the need for low cost in the underground units may cause there to be a relatively large tolerance in frequencies generated thereby.

A trade-off of the likely natural and man-made noise spectrum and of other factors, such as losses in passing through the ground, has led to the conclusion that the current pulses generated underground in the loop should occur at a relatively high rate, such as about 500 per second. These pulse signals could be sent continuously, but will more likely be sent in bursts, such as 1 second on and 5 seconds off, to conserve battery power underground. If these pulses are sent at a rate of $f_1$ per second where $f_1$ is in the order of 500/second, then the received signals at the surface will contain energy at $f_1$, $2f_1$, $3f_1$, etc.

As a result of the poor S/N environment, the surface receiver must respond to the energy in several of these spectral lines, but must reject noise. There are several ways of achieving this requirement including delay-line and integrator techniques; however, the most simple method is to synthesize a comb filter from narrow band filters at frequencies $f_1$; $2f_1$; $3f_1$; etc. These filters may be either at the above frequencies or at some other frequency sidestepped from them to serve the usual purposes of avoiding the need for an unmanageable amount of gain at one frequency and allowing the filters to be constructed at frequencies where this is most convenient. The bandwidth of each of these filters should be as narrow as possible but must be wide enough to tolerate frequency errors, both long and short term, in the underground transmitters and caused by the effects of transmission through the earth. The smallest bandwidth likely to be tolerable for the filters in about 10 Hz for the first filter and 20, 30, etc., Hz for succeeding filters. This simple receiver has two problems. The first problem is that if there are $n$ underground sources operating at pulse rates of $f_1, f_2 \ldots f_r, f_n$, then there must be a different set of filters for each. Changing the local oscillator frequency does not permit the receiver to be tuned to different sources, because if the local oscillator frequency is changed to bring the $f_2$ sidestepped frequency to the center of the first filter, then the sidestepped $2f_2$, $3f_2$, etc. frequencies will not be centered in the filters appropriate to them. The second problem is that compensation for errors in the underground transmitter frequency (pulse rate) cannot be provided other than by widening filter bandwidths.

SUMMARY OF THE INVENTION

Accordingly, it is an object of the present invention to overcome the above-mentioned problems of the prior art by providing a receiver system having the advantages of coherent addition of pulse components and simplified filter design.

Another object of the present invention is to utilize an adjustable local oscillator generator to supply local oscillator signals to mixers in frequency selective paths in a receiver system for locating underground transmitters such that the receiver system can be simultaneously turned to different fundamental transmitter frequencies and harmonics thereof.

The present invention has a further object in the use of different local oscillators for mixers in parallel frequency selective paths or chains to permit tuning to different incoming transmitter frequencies and their harmonics.

An additional object of the present invention is to use coherent local oscillators to provide local oscillator signals to mixers in frequency selective paths of a comb filter for receiver system to permit coherent addition of signal components (primary frequency and the harmonics thereof) to produce an improved signal-to-noise ratio.

Yet another object of the present invention is to synthesize local oscillator signals for a receiver system at higher frequencies and divide the signals to avoid intolerable interference problems.

Some of the advantages of the present invention over the prior art are that the receiver system can be easily tuned to different underground transmitter frequencies to distinguish therebetween, the bandpass filters in the frequency selective paths require only the narrowest possible bandwiths to thereby improve the signal-to-noise ratio of the receiver system, the coherent addition of fundamental frequency or pulse rate and the harmonics thereof improves the signal-to-noise ratio of the receiver system.

The present invention is generally characterized in a receiver system for receiving incoming signals from a plurality of transmitters including a power divider for receiving an incoming signal and providing a plurality of outputs corresponding thereto, a plurality of frequency selective paths each coupled with one of the outputs of the power divider and each including a mixer and a bandpass filter for passing the fundamental frequency of the incoming signal and harmonics thereof, a power adder for adding the signals from the bandpass filters in the frequency selective paths, and an adjustable local oscillator for supplying different local oscillator signals to each of the mixers whereby the receiver system can be tuned to different transmitter fundamental frequencies and simultaneously to harmonics thereof.

Other objects and advantages of the present invention will become apparent from the following description of the preferred embodiment taken in conjunction with the accompanying drawings.

BRIEF DESCRIPTION OF THE DRAWINGS

FIG. 1 is a schematic diagram of a prior art receiver system.

FIG. 2 is a schematic diagram of a receiver system according to the present invention.

DESCRIPTION OF THE PREFERRED EMBODIMENT

Figure 3:
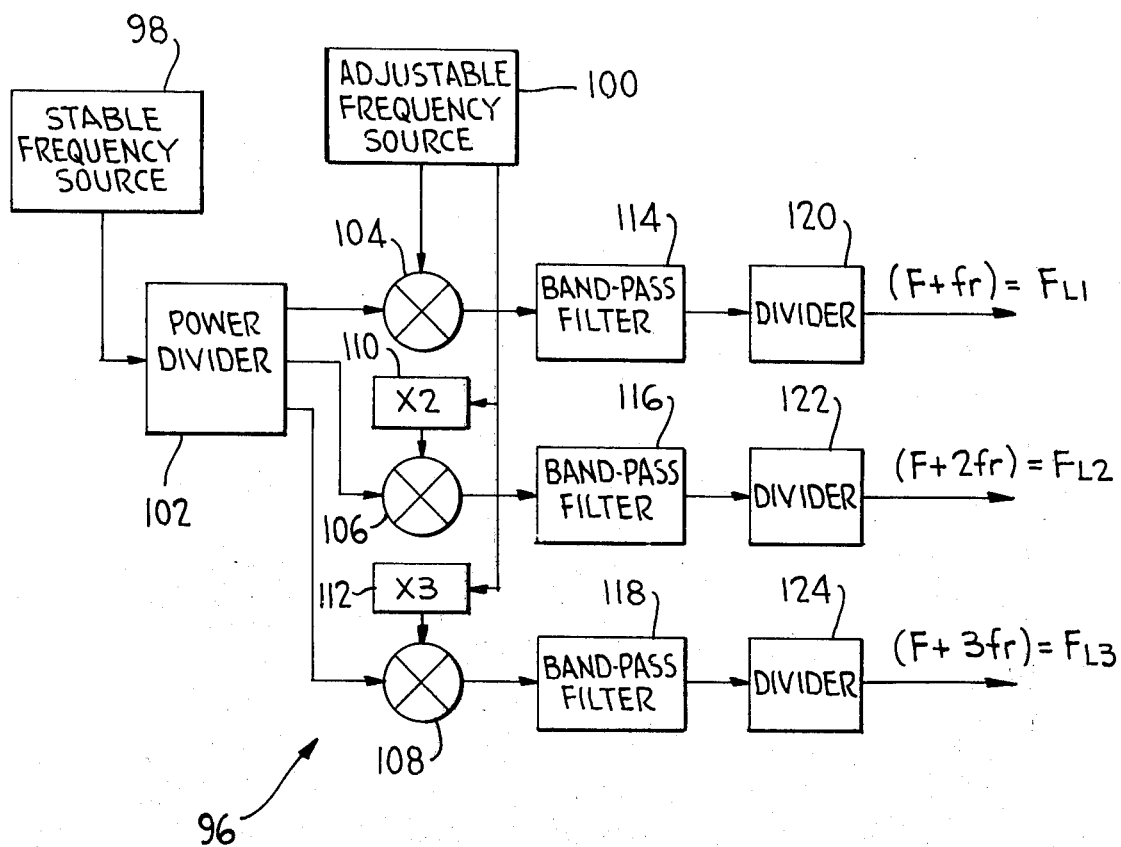
FIG. 3 is a schematic diagram of a local oscillator generator for use with the receiver system in accordance with the present invention.

A simple prior art receiver system is shown in FIG. 1 and includes a bandpass filter 10, approximately 500 to 3000 Hz, receiving signals from underground transmitters on a line 12 from an antenna, not shown, the signals including the fundamental and harmonic frequencies from such transmitter, such as frequencies $f_1$, $2f_1$, $3f_1$, etc. The filtered signal from filter 10 is passed through an amplifier 14 to a mixer 16 receiving a local oscillator signal $F_L$ from a local oscillator 18. The output of the mixer 16 is supplied to a power divider 20 which supplies outputs in parallel paths through filters 22, 24 and 26, amplifiers 28, 30 and 32 and level adjusting means, such as variable resistances, 34, 36 and 38 to a power adder 40. A detector 42 receives the output from power adder 40 to process the received signal in any suitable manner.

The narrow band filters 22, 24 and 26 synthesize a comb filter at frequencies $f_1$, $2f_1$ and $3f_1$, it being realized that as many paths as desired can be provided between power divider 20 and power adder 40. The filters 22, 24 and 26 are sidestepped to be at $(F_L-f_1)$, $(F_L-2f_1)$ and $(F_L-3f_1)$, respectively, and bandwidths of 10Hz, 20Hz and 30 Hz, respectively, where the local oscillator frequency $F_L$ is typically on the order of 10 to 20 KHz. The underground transmitters or sources operate at frequencies or pulse rates $f_1, f_2 \ldots f_r, f_n$ requiring a different set of filters for each underground transmitter frequency, FIG. 1 illustrating a three-filter set for transmitter frequency $f_1$ only. If the local oscillator frequency $F_L$ is changed or adjusted to tune the receiver to different fundamental transmitter frequencies, the sidestepped frequencies will not be centered in the appropriate filters.

A receiver system 43 according to the present invention is shown in FIG. 2 and includes a 500 to 3000 Hz bandpass filter 44 receiving incoming signals from underground transmitters via an antenna, not shown, the incoming signals including the fundamental and harmonic frequencies of each transmitter. The output of filter 44 is supplied to a power divider 46 through an amplifier 48, the power divider splitting the received signal for providing a plurality of outputs corresponding thereto for supply to a plurality of frequency selective paths or chains 50, 52 and 54. While only three frequency selective paths have been shown in FIG. 2 corresponding to the paths required for a specific transmitter frequency, it will be appreciated that the number of frequency selective paths will in practice depend upon the number of harmonics to be combined for each transmitter frequency. Frequency selective path 50 includes a mixer 56 receiving a local oscillator signal $F_{L1}$ at 58, a bandpass intermediate frequency filter 60, an amplifier 62, a level adjusting variable resistance 64 and a phase adjuster 66 while frequency selective path 52 includes a mixer 68 receiving a local oscillator signal $F_{L2}$ at 70, a bandpass intermediate frequency filter 72, an amplifier 74, a level adjusting variable resistance 76 and a phase adjuster 78. Similarly, frequency selective path 54 includes a mixer 80 receiving a local oscillator signal $F_{L3}$ at 82, a bandpass intermediate frequency filter 84, an amplifier 86, a level adjusting variable resistance 88 and a phase adjuster 90. The outputs of phase adjusters 66, 78 and 90 are supplied to a power adder 92 which provides an output to conventional detector circuitry 94.

The receiver system 43 operates to break the received signal into a completely separate chain for each desired component of the signal. Assuming that a signal from a transmitter is at a fundamental frequency $f_r$, the local oscillator signals $F_{L1}$, $F_{L2}$ and $F_{L3}$ will be equal to $(F+f_r)$, $(F+2f_r)$ and $(F+3f_r)$, respectively, where F is the center frequency of each of the filters 60, 72 and 84 which have bandwidths of 10Hz. In order to permit the receiver system 43 to operate with different transmitter frequencies, such as $f_1, f_2 \ldots f_r, f_n$ and their harmonics and in order to permit trimming to compensate for errors in transmitter frequency, the local oscillator frequencies $F_{L1}$, $F_{L2}$ and $F_{L3}$ should be adjustable. The local oscillator frequencies preferably are derived from a coherent source to permit the receiver to produce coherent addition of the signals passed by selective frequency paths 50, 52 and 54 at power adder 92.

A local oscillator generator 96 for use with receiver system 43 in accordance with the present invention is shown in FIG. 3 and includes a stable frequency source or oscillator 98, which is trimmable to compensate for transmitter errors and has an output frequency NF equalling any predetermined number N times the center frequency F of bandpass filters 60, 72 and 84, and an adjustable frequency source of oscillator 100 having an output frequency $Nf_r$ equalling N times frequency $f_r$ which can be set to provide fundamental frequencies $Nf_1, Nf_2 \ldots Nf_r, Nf_n$. The output of frequency source 98 is supplied through a power divider 102 to mixers 104, 106 and 108 which also receive the output of frequency source 100 via appropriate frequency multipliers 110 and 112 such that frequencies NF and $Nf_r$ are mixed to obtain frequencies N times larger than the desired local oscillator frequencies. Frequency multiplier 110 supplies $2Nf_r$ to mixer 106 while frequency multiplier 112 supplies $3Nf_r$ to mixer 108; and, similarly, other mixers and frequency multipliers would be used in additional local oscillator frequency generating paths dependent upon the number of local oscillator frequencies required for the receiver 43. The outputs of mixers 104, 106 and 108 are supplied to bandpass filters 114, 116 and 118, respectively, passing frequencies $N(F+f_r)$, $N(F+2f_r)$ and $N(F+3f_r)$, respectively; and, the signals passed by the bandpass filters are divided by N by frequency dividers 120, 122 and 124. The division by N provides the desired local oscillator frequencies $F_{L1}$, $F_{L2}$ and $F_{L3}$ for inputs 58, 70 and 82 of receiver 43 free of signals at the incoming frequencies thereby eliminating intolerable interference. The number N is chosen such that the local oscillator frequencies are out of the band of the incoming frequencies and also such that the frequency dividers 120, 122 and 124 can be formed of a simple digital circuit, each a single IC unit. For example, N can conveniently be 8 or 16.

The local oscillator frequencies $F_{L1}$, $F_{L2}$, and $F_{L3}$ are all essentially noise-free; and, therefore, the characteristics of bandpass filters 60, 72 and 84 are required to eliminate undesired mixing products, undesired multiples of the sources and undesired division products while they are not required to have a very narrow bandwidth to reduce noise. If the transmitter frequencies $f_1$, $f_2 \ldots f_r, f_n$ are all in a relatively narrow band, for example from 400 to 600 Hz or from 450 to 650 Hz, it is possible with an appropriate choice of N to use the same filters in the local oscillator generator 96 for all pulse rates of frequencies; and, accordingly, the only requirement to detect different transmitter frequencies or pulse rates is to set frequency source 100 to the appropriate frequency, retrim frequency source 98 and adjust the level and phase adjustors as may be required to compensate for underground transmitter errors and path variations.

Since all the incoming frequencies are harmonics of the same underground transmitter and since the local oscillator signals are all derived from the same source, the signals at the outputs of bandpass filters 60, 72 and 84 will all be at exactly the same frequency and can be made to be nearly phase coherent by means of phase adjustors 66, 78 and 90. Thus, a stronger and improved output is produced at power adder 92, the signal-to-noise ratio (S/N) being increased because the noise in each frequency selective path is incoherent. The phase adjustments compensate for possible slight variations in propagation times through the ground, the phase adjustments being manually made to produce the best S/N. Since the local oscillator frequencies can be adjusted by trimming frequency source 98 to eliminate long-term frequency errors in the underground transmitter, it is possible to make the bandwidth of bandpass filters 60, 72 and 84 narrow, on the order of 10 Hz.

Inasmuch as the present invention is subject to many variations, modifications and changes in detail. it is intended that all matter discussed above or shown in the accompanying drawings be interpreted as illustrative and not in a limiting sense.

What is claimed is:

1. A receiver system for receiving incoming signals from a plurality of transmitters comprising
    power dividing means for receiving an incoming signal and providing a plurality of outputs corresponding thereto;
    a plurality of frequency selective paths each coupled with one of said outputs of said power dividing means and each including a mixer and a bandpass filter for passing the fundamental frequency of the incoming signal and harmonics thereof;
    power adding means for adding the signals from said bandpass filters in said frequency selective paths; and
    adjustable local oscillator means for supplying different local oscillator signals to each of said mixers whereby said receiver system can be tuned to different transmitter fundamental frequencies and simultaneously to harmonics thereof.

2. A receiver system as recited in claim 1 wherein each of said frequency selective paths includes phase adjusting means.

3. A receiver system as recited in claim 1 wherein each of said bandpass filters has the same center frequency.

4. A receiver system as recited in claim 3 wherein each of said bandpass filters has a relatively narrow bandwidth.

5. A receiver system as recited in claim 1 wherein said local oscillator means includes means for producing coherent local oscillator signals to said mixers to produce coherent adding of signals by said power adding means.

6. A receiver system as recited in claim 5 wherein said local oscillator means includes a frequency source producing an output frequency NF where N is any predetermined number and F is the center frequency of said bandpass filters, an adjustable frequency source settable to produce an output frequency $Nf_r$ where $f_r$ is the frequency of an incoming signal to be received from a transmitter, a plurality of mixers receiving said output frequencies NF and $Nf_r$, and frequency divider means for dividing the frequency outputs of said mixers by N to produce said local oscillator signals.

7. A receiver system as recited in claim 6 wherein each of said bandpass filters has a relatively narrow bandwidth.

8. A receiver system as recited in claim 6 wherein each of said frequency selective paths includes phase adjusting means and level adjusting means.

9. A receiver system as recited in claim 8 wherein said local oscillator means includes power dividing means for supplying said, output frequency NF to said plurality of mixers, and frequency multiplying means for multiplying the frequency of said output frequency $Nf_r$ supplied to selected ones of said mixers.

10. A receiver system as recited in claim 9 wherein said local oscillator means includes a bandpass filter coupling each of said mixers to said frequency divider means.

* * * * *